US012676471B2

(12) United States Patent
Lang

(10) Patent No.: US 12,676,471 B2
(45) Date of Patent: Jul. 7, 2026

(54) CONTROL CIRCUIT OF GALVANOMETER MOTOR AND LiDAR

(71) Applicant: SUTENG INNOVATION TECHNOLOGY CO., LTD., Shenzhen (CN)

(72) Inventor: Huamin Lang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 255 days.

(21) Appl. No.: 18/383,028

(22) Filed: Oct. 23, 2023

(65) Prior Publication Data

US 2024/0146049 A1     May 2, 2024

(30) Foreign Application Priority Data

Oct. 26, 2022     (CN) .......................... 202211321728.5

(51) Int. Cl.
  *H02H 7/08*       (2006.01)
  *G01S 7/481*      (2006.01)
  *G02B 26/10*      (2006.01)
(52) U.S. Cl.
  CPC ......... *H02H 7/0827* (2013.01); *G01S 7/4817* (2013.01); *G02B 26/105* (2013.01)

(58) Field of Classification Search
  CPC ..... H02H 7/0827; G01S 7/4817; G01S 7/481; G02B 26/105; H02P 29/00
  See application file for complete search history.

(56) References Cited

U.S. PATENT DOCUMENTS

| | | | | |
|---|---|---|---|---|
| 4,099,068 A * | 7/1978 | Kobayashi | ............... | H02H 3/24 |
| | | | | 361/187 |
| 5,600,217 A * | 2/1997 | Bartlett | ................... | H02P 7/281 |
| | | | | 318/434 |
| 6,380,649 B1 * | 4/2002 | Brown | .................... | F16C 41/04 |
| | | | | 310/68 B |
| 6,650,498 B1 * | 11/2003 | Albrecht | ............... | G11B 19/04 |
| 8,896,899 B1 * | 11/2014 | Tang | ................... | G02B 26/105 |
| | | | | 359/221.3 |

* cited by examiner

*Primary Examiner* — Crystal L Hammond
*Assistant Examiner* — Samantha L Faubert
(74) *Attorney, Agent, or Firm* — BAYES PLLC

(57)                    ABSTRACT

Embodiments of this application disclose a control circuit of a galvanometer motor and a LiDAR. The control circuit is configured to control the galvanometer motor to be discharged during a power failure, and the control circuit includes a switch circuit and a discharge circuit. The switch circuit is configured to access a control voltage; and the discharge circuit is connected to the switch circuit and configured to be connected to a driving positive electrode and a driving negative electrode of the galvanometer motor.

8 Claims, 6 Drawing Sheets

CONTROL CIRCUIT OF GALVANOMETER MOTOR AND LiDAR

CROSS-REFERENCE TO RELATED APPLICATION

The present application claims the benefit of priority to Chinese Patent Application No. 202211321728.5, filed on Oct. 26, 2022, which is hereby incorporated by reference in its entirety.

TECHNICAL FIELD

This application relates to the technical field of Light Detection and Ranging (LiDAR), and in particular, to a control circuit of a galvanometer motor and a LiDAR.

TECHNICAL BACKGROUND

A LiDAR drives a galvanometer to work via a galvanometer motor to change an incident angle and an outgoing angle of a laser beam incident on the galvanometer, thereby implementing a laser scanning function through the galvanometer. However, when the entire LiDAR is turned off, enters a sleep state or is at other power failure moments, because a current in inductance of a galvanometer motor is characterized by non-abrupt changes, the current continues existing, which causes the inductance in the galvanometer motor to generate a reverse induction electromotive force, so that the galvanometer motor continues driving the galvanometer to work. The galvanometer motor is not in a micro-step working state precisely controlled under an external voltage at this time, instead, the galvanometer motor continues working under the reverse induction electromotive force generated by the galvanometer motor internally, and therefore, the galvanometer motor is in an uncontrollable state, stepping of the galvanometer is uncontrollable, and the galvanometer deviates from a predetermined vibration region. At this time, the galvanometer is likely to collide with an ambient structure, which is likely to damage the galvanometer.

SUMMARY

Embodiments of this application provide a control circuit of a galvanometer motor and a LiDAR, so that a switch circuit controls a discharge circuit to be short-circuited based on a control voltage during a power failure of the galvanometer motor, to release a reverse induction electromotive force generated because the galvanometer motor continues working under action of inertia at the moment of the power failure of the galvanometer motor, thereby preventing the galvanometer motor from continuing driving the galvanometer to work due to the reverse induction electromotive force generated during the power failure, and further preventing the galvanometer from interfering with another component of the LiDAR and being damaged because of deviation from a predetermined vibration region.

According to a first aspect, an embodiment of this application provides a control circuit of a galvanometer motor, configured to control the galvanometer motor to be discharged during power failure, where the control circuit includes:

a switch circuit, configured to access a control voltage; and a discharge circuit, connected to the switch circuit and configured to be connected to a driving positive electrode and a driving negative electrode of the galvanometer motor, where during the power failure of the galvanometer motor, the switch circuit controls the discharge circuit to be short-circuited based on the control voltage, to release a reverse induction electromotive force between the driving positive electrode and the driving negative electrode of the galvanometer motor that is generated due to the power failure.

Further, the switch circuit includes:

a voltage divider circuit including at least two voltage divider resistors, where the voltage divider circuit has a terminal configured to access the control voltage, and the other terminal that is grounded, and there is a voltage divider node between any two voltage divider resistors; and a first switch transistor having a first input terminal, a first output terminal and a first controlled terminal, where the first input terminal is configured to access a first control voltage, the first output terminal is connected to the discharge circuit, and the first controlled terminal is connected to the voltage divider node.

Further, the voltage divider circuit includes a first voltage divider resistor and a second voltage divider resistor connected in series, a first terminal of the first voltage divider resistor is configured to access the first control voltage, a second terminal of the first voltage divider resistor is connected to a first terminal of the second voltage divider resistor and the voltage divider node, and a second terminal of the second voltage divider resistor is grounded.

Further, the discharge circuit includes a second switch transistor, a third switch transistor and a bias resistor, the second switch transistor has a second input terminal, a second output terminal and a second controlled terminal, the third switch transistor has a third input terminal, a third output terminal and a third controlled terminal, the second controlled terminal and the third controlled terminal are jointly connected to the first output terminal and a first terminal of the bias resistor, the second output terminal and the third output terminal are jointly connected to a second terminal of the bias resistor, the second input terminal is connected to the driving positive electrode, and the third input terminal is connected to the driving negative electrode.

Further, the discharge circuit further includes:

a diode, where an anode of the diode is connected to a second terminal of the bias resistor, and a cathode of the diode is grounded.

Further, the discharge circuit further includes:

an adjusting resistor, where a first terminal of the adjusting resistor is connected to a second terminal of the bias resistor, and the second terminal of the adjusting resistor is connected to the anode of the diode.

Further, the discharge circuit further includes:

a first discharge resistor, where the second input terminal is connected to the driving positive electrode through the first discharge resistor; and a second discharge resistor, where the third input terminal is connected to the driving negative electrode through the second discharge resistor.

Further, the first switch transistor is a PMOS transistor, and the second switch transistor and the third switch transistor are both NMOS transistors.

Further, the discharge circuit further includes:

a voltage source, connected to the switch circuit and configured to: output a high-level control voltage to the switch circuit during the power failure of the galvanometer motor, and output a low-level control voltage to the switch circuit when the galvanometer motor is powered on.

According to a second aspect, an embodiment of this application provides LiDAR, including:

a galvanometer, configured to change an outgoing direction of a laser beam;

a galvanometer motor, drivingly connected to the galvanometer and having a driving positive electrode and a driving negative electrode; and the control circuit of a galvanometer motor in any one of the foregoing implementations, where a discharge circuit is connected to the driving positive electrode and the driving negative electrode, and during the power failure of the galvanometer motor, the switch circuit controls the discharge circuit to be short-circuited based on the control voltage, to release a reverse induction electromotive force between the driving positive electrode and the driving negative electrode that is generated due to the power failure. Based on the control circuit of the galvanometer motor and the LiDAR provided in this application, when the power failure of the galvanometer motor occurs because the LiDAR is turned off or enters a sleep state, the switch circuit controls the discharge circuit to be short-circuited based on the control voltage, the driving positive electrode and the driving negative electrode of the galvanometer motor are also short-circuited at this time, and therefore, the reverse induction electromotive force between the driving positive electrode and the driving negative electrode of the galvanometer motor that is generated because the galvanometer motor continues working under action of inertia at the moment of the power failure can be released, thereby preventing the galvanometer motor from uncontrollably driving the galvanometer to work due to the reverse induction electromotive force, and from causing the galvanometer to interfere with another component around the LiDAR and be damaged.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application.

REFERENCE SIGNS

100—LiDAR; 10—galvanometer; 20—galvanometer motor; 30—drive circuit; 40—control circuit; 41—switch circuit; 411—voltage divider circuit; R1—first divider resistor; R2—second divider resistor; M1—first switch transistor; a1—first controlled terminal; b1—first input terminal; c1—first output terminal; 42—discharge circuit; M2—second switch transistor; a2—second controlled terminal; b2—second input terminal; c2—second output terminal; M3—third switch transistor; a3—third controlled terminal; b3—third input terminal; c3—third output terminal; R3—bias resistor; R4—adjusting resistor; R5—first discharge resistor; R6—second discharge resistor; D—diode; 43—voltage source; 50—control system; V1—voltage difference between a driving positive electrode and a driving negative electrode; V1+—driving positive electrode; V—driving negative electrode; and V2—control voltage.

DETAILED DESCRIPTION

To make objectives, technical solutions and advantages of the present application clearer, embodiments of the present application are described in further detail below with reference to the drawings.

When the following description relates to the accompanying drawings, unless otherwise specified, the same numbers in different accompanying drawings represent the same or similar elements. Implementations described in the following exemplary embodiments do not represent all the implementations consistent with those in this present application. On the contrary, the implementations are merely examples of apparatuses and methods consistent with those in some aspects of this application detailed in the appended embodiments.

In the descriptions of the present application, it shall be understood that the terms such as "first" and "second" are merely intended for a purpose of description, and shall not be understood as an indication or implication of relative importance. The person skilled in the art can understand specific meanings of the foregoing terms in the present application to a specific situation. In addition, in the descriptions of the present application, "a plurality of" means two or more unless otherwise specified. Herein, "and/or" is an association relationship for describing associated objects and indicates that three relationships may exist. For example, A and/or B may mean the following three cases: Only A exists, both A and B exist, and only B exists. The character "/" generally indicates an "or" relationship between the associated objects.

Unless otherwise defined, all technical and scientific terms used herein shall have the same meanings as those commonly understood by a person skilled in the art to which this application pertains. The terms used in this specification are only used to describe a purpose of specific embodiments, but are not intended to limit this application. The term "and/or" used herein includes any and all combinations of one or more related listed items.

Figure 1:
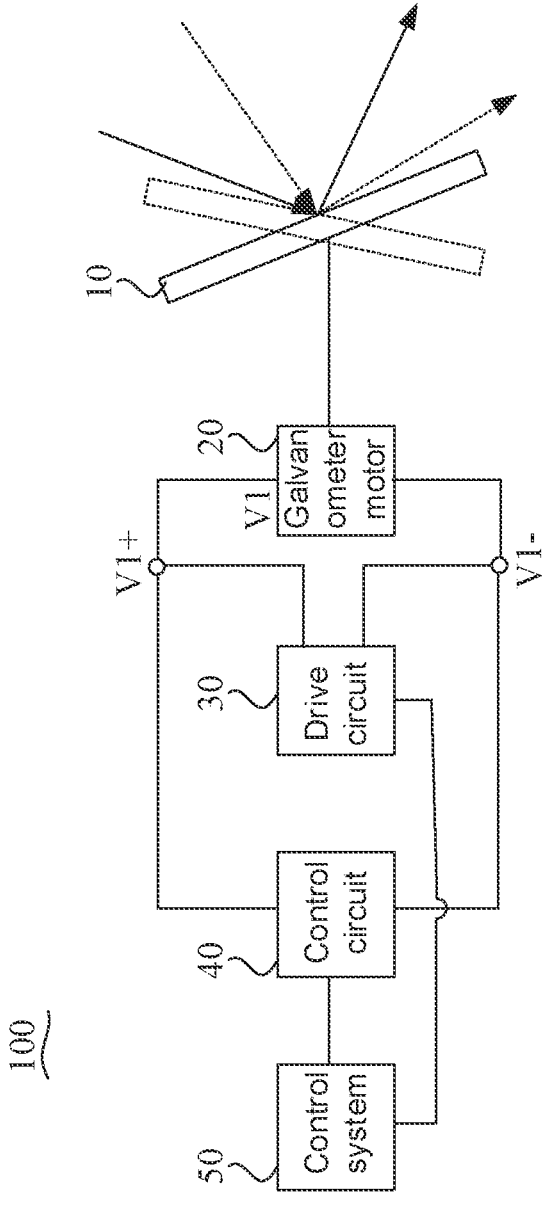
FIG. 1 is a schematic structural diagram of a framework of a LiDAR according to an embodiment of this application.
Figure 2:
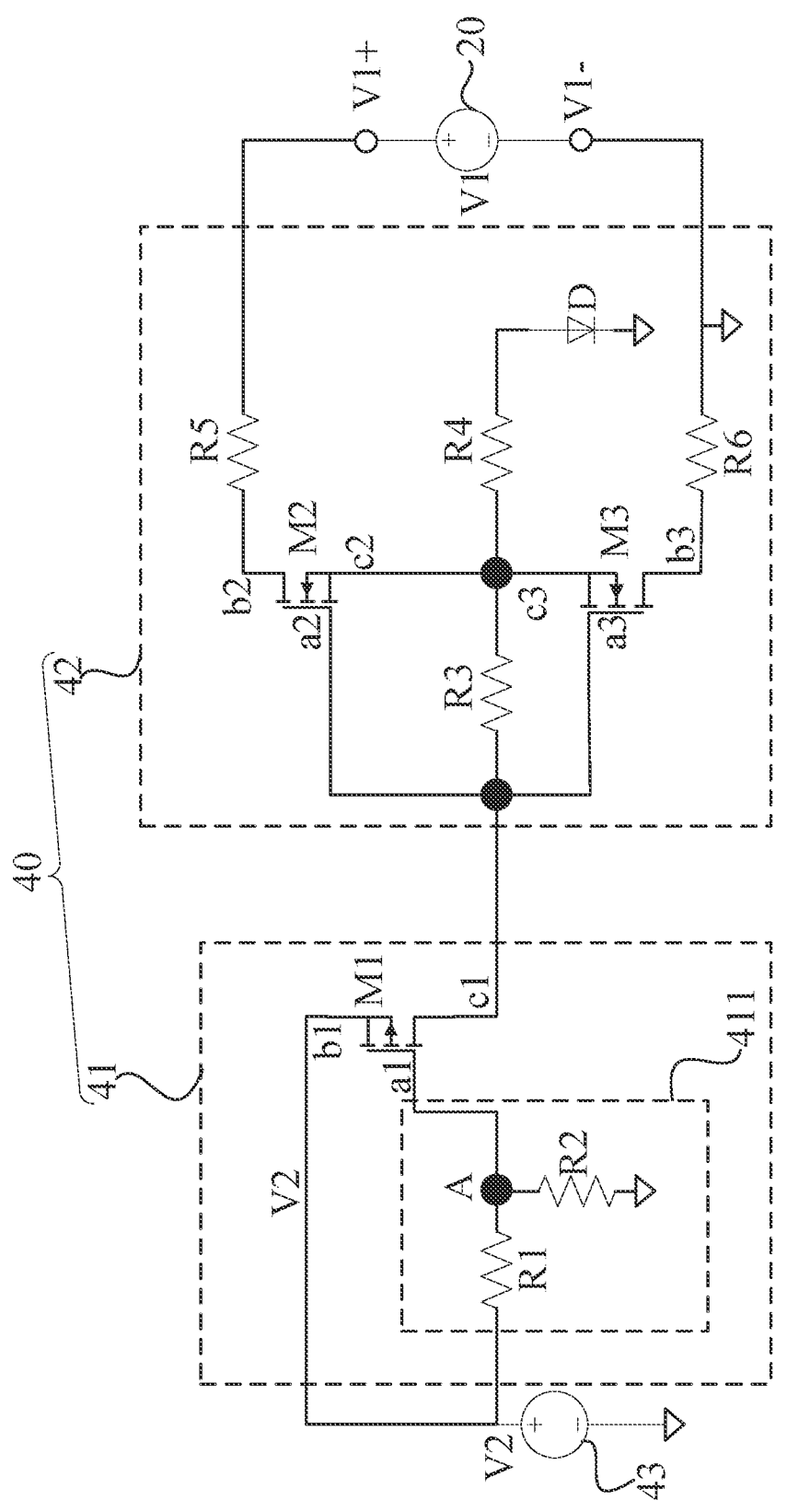
FIG. 2 is a schematic circuit diagram of a control circuit of a galvanometer motor according to an embodiment of this application.

FIG. 1 and FIG. 2 show a LiDAR 100 in an embodiment of this application. The LiDAR 100 includes a galvanometer 10, a galvanometer motor 20, a drive circuit 30, a control circuit 40 of the galvanometer motor 20 and a control system 50. The galvanometer 10 is drivingly connected to the galvanometer motor 20. The galvanometer motor 20 has a driving positive electrode V1+ and a driving negative electrode V1−, and the driving positive electrode V1+ and the driving negative electrode V1− are electrically connected to the drive circuit 30 and the control circuit 40. The drive circuit 30 and the control circuit 40 are electrically connected to the control system 50.

During a normal working process of the LiDAR 100, the control system 50 sends a first control signal to the drive circuit 30, the drive circuit 30 controls the galvanometer motor 20 to work based on the first control signal, and the galvanometer motor 20 drives the galvanometer 10 to rotate, to change a position of the galvanometer 10 and to further change an incident angle and an outgoing angle of a laser beam incident on the galvanometer 10, thereby implementing a laser scanning function of the LiDAR 100. In an embodiment, the drive circuit 30 provides positive and negative voltage control for the driving positive electrode V1+ and the driving negative electrode V1−, so that the galvanometer motor 20 drives the galvanometer 10 to reciprocate and vibrate, and the reciprocating and vibrating galvanometer 100 implements the laser scanning function of the LiDAR 100. For example, when there is a positive voltage between the driving positive electrode V1+ and the driving negative electrode V1−, the galvanometer motor 20 drives the galvanometer 10 to rotate clockwise; and when there is a negative voltage between the driving positive electrode V1+ and the driving negative electrode V1−, the galvanometer motor 20 drives the galvanometer 10 to rotate anticlockwise. The foregoing positive voltage means that a voltage at the driving positive electrode V1+ is higher than a voltage at the driving negative electrode V1−, and the foregoing negative voltage means that the voltage at the driving positive electrode V1+ is lower than the voltage at the driving negative electrode V1−. In an embodiment, the drive circuit 30 can individually control the voltage at the driving positive electrode V1+ to continuously change between +12V and −12V, while the voltage at the driving negative electrode V1− remains at 0V, so that a voltage difference between the driving positive electrode V1+ and the driving negative electrode V1− continuously changes between +12V and −12V. Therefore, the galvanometer motor 10 gradually reciprocates to rotate from a clockwise limit position at +12V to an anticlockwise limit position at −12V, and then gradually rotate from the anticlockwise limit position at −12V to the clockwise limit position at +12V, and in this way, the laser scanning function of the LiDAR 100 can be implemented by using the galvanometer motor 20 to drive the galvanometer 10 to reciprocate between the two limit positions.

When the LiDAR 100 does not need to work, but needs to be turned off or enter a sleep state, the control system 50 controls the voltage difference V1 between the driving positive electrode V1+ and the driving negative electrode V1− of the galvanometer motor 20 to be abruptly changed to 0V through the drive circuit 30. At this time, because a current in inductance of the galvanometer motor 20 is characterized by non-abrupt changes, the current in the inductance continues existing, and the voltage between the driving positive electrode V1+ and the driving negative electrode V1− is reversed, that is, the galvanometer motor 20 continues rotating under action of inertia, which causes the inductance in the galvanometer motor 20 to generate a reverse induction electromotive force in the galvanometer motor 20. At this time, the galvanometer motor 20 is not in a micro-step working state precisely controlled by the drive circuit 30, instead, the galvanometer motor continues working under the reverse induction electromotive force generated by the galvanometer motor internally, and therefore, the galvanometer motor 20 is in an uncontrollable state, stepping of the galvanometer 10 connected to the galvanometer motor 20 is uncontrollable, the galvanometer 10 deviates from a predetermined vibration region at which the galvanometer is supposed to be located during power failure, and the galvanometer is likely to interfere and collide with another component of the LiDAR 100, which is likely to damage the galvanometer 10.

To resolve the foregoing technical problem, in an embodiment of this application, a control circuit 40 of the galvanometer motor 20 is added to the LiDAR 100, the control circuit 40 is connected to the driving positive electrode V1+ and the driving negative electrode V1−, and in this way, when the power failure of the galvanometer motor 20 occurs because the LiDAR 100 is turned off, enters a sleep state, and so on, the control circuit 40 controls the driving positive electrode V1+ and the driving negative electrode V1− to be short-circuited, to release the reverse induction electromotive force generated because the galvanometer motor 20 continues working under action of inertia at the moment of the power failure of the galvanometer motor 20, thereby preventing the galvanometer motor 20 from uncontrollably driving the galvanometer 10 to work due to the reverse induction electromotive force, and from causing the galvanometer 10 to interfere with another component around the LiDAR 100 and to be damaged.

Referring to FIG. 1 and FIG. 2, in some embodiments, the control circuit 40 includes a switch circuit 41 and a discharge circuit 42. The switch circuit 41 is configured to access the control voltage V2, the switch circuit 41 can be turned on or off under the control of the control voltage V2, and the discharge circuit 42 is connected to the switch circuit 41, and is connected to the driving positive electrode V1+ and the driving negative electrode V1− of the galvanometer motor 20. When the power failure of the galvanometer motor 20 occurs because the LiDAR 100 is turned off or enters a sleep state, the switch circuit 41 controls the discharge circuit 42 to be short-circuited according to the control voltage V2. At this time, the driving positive electrode V1+ and the driving negative electrode V1− of the galvanometer motor 20 are also short-circuited, and therefore, the reverse induction electromotive force generated because the galvanometer motor 20 continues working under action of inertia can be released. Conversely, during the normal working process of the LiDAR 100, the switch circuit 41 controls the discharge circuit 42 to be disconnected according to the control voltage V2. At this time, the drive circuit 30 inputs a drive voltage to the driving positive electrode V1+ and the driving negative electrode V1− of the galvanometer motor 20, to control the galvanometer motor 20 and the galvanometer 10 to work normally.

Referring to FIG. 2, in some embodiments, the switch circuit 41 includes a voltage divider circuit 411 and a first switch transistor M1. The voltage divider circuit 411 includes at least two voltage divider resistors, and the voltage divider circuit 411 has a terminal for accessing the control voltage V2, and the other terminal that is grounded. There is a voltage divider node A between any two voltage divider resistors. That is, as long as the voltage divider circuit 411 is able to divide the control voltage V2 and provide a divided voltage to the first switch transistor M1, specific circuit forms are not restricted. The first switch transistor M1 has a first input terminal b1, a first output terminal c1 and a first controlled terminal a1. The first input terminal b1 is configured to access the first control voltage V2, and the first controlled terminal a1 is connected to the voltage divider node A, so that a voltage difference can be generated between the first input terminal b1 and the first controlled terminal a1 to implement conduction. The first output terminal c1 is connected to the discharge circuit 42, so that the discharge circuit 42 can be controlled to be short-circuited or disconnected. The discharge circuit 42 can be short-circuited when the first switch transistor M1 is turned on, and can be disconnected when the first switch transistor M1 is turned off; or the discharge circuit can be short-circuited when the first switch transistor M1 is turned off, and can be disconnected when the first switch transistor M1 is turned on, and this depends on different circuit forms, provided that the discharge circuit 42 can be controlled to be short-circuited or disconnected through the first switch transistor M1. For ease of description below, for example, the discharge circuit 42 is short-circuited when the first switch transistor M1 is turned on, and the discharge circuit 42 is disconnected when the first switch transistor M1 is turned off.

In some embodiments, the voltage divider circuit 411 includes a first voltage divider resistor R1 and a second voltage divider resistor R2 connected in series. A first terminal of the first voltage divider resistor R1 is configured to access the first control voltage V2, a second terminal of the first voltage divider resistor R1 is connected to a first terminal of the second voltage divider resistor R2 and the voltage divider node A, and a second terminal of the second voltage divider resistor R2 is grounded. The first voltage divider resistor R1 and the second voltage divider resistor R2 divide the control voltage V2, and input a node voltage at the voltage divider node A (that is, a voltage across two terminals of the second voltage divider resistor R2) into the first controlled terminal a1, while the first input terminal b1 directly accesses the control voltage V2, so that a voltage difference capable of turning on the first switch transistor M1 is generated between the first controlled terminal a1 and the first input terminal b1 when the control voltage V2 is a high-level control voltage V2, which can control the first switch to be turned on, and can further control the discharge circuit 42 to be short-circuited. Conversely, a voltage difference incapable of turning on the first switch transistor M1 is generated between the first controlled terminal a1 and the first input terminal b1 when the control voltage V2 is a low-level control voltage V2, and at this time, the first switch transistor M1 is turned off, which can further control the discharge circuit 42 to be disconnected. In addition, the voltage difference between the first controlled terminal a1 and the first input terminal b1 can also be adjusted by adjusting resistance of the second voltage divider resistor R2, so that the first switch transistor M1 is turned on faster.

In some embodiments, the second voltage divider resistor R2 can be replaced with another electronic device such as a diode; and an anode of the diode is connected to the second terminal of the first voltage divider resistor R1 and the first controlled terminal a1, and when the control voltage V2 is the high-level control voltage V2, a voltage at the first controlled terminal a1 can be stabilized at a conduction voltage of the diode such as 0.7V by using a unidirectional conduction characteristic of the diode, so that there is a voltage difference between the first controlled terminal a1 and the input terminal b1, thereby turning on the first switch transistor M1. When the control voltage V2 is the low-level control voltage V2, the diode connects the first controlled terminal a1 to the ground, so that the first switch transistor M1 is turned off. In addition, the second voltage divider resistor R2 can also be replaced with an inductor, a capacitor and the like, or can be replaced with a combination circuit of at least two of a resistor, a diode, an inductor and a capacitor, provided that the second voltage divider resistor can divide the voltage together with the first voltage divider resistor R1 when the control voltage V2 is the high-level control voltage V2, so that the first switch transistor M1 is turned on; and when the control voltage V2 is the low-level control voltage V2, the first controlled terminal a1 can be grounded, so that the first switch transistor M1 is turned off.

In some embodiments, a voltage source 43 is also included, and is connected to the switch circuit 41, and connected to the first controlled terminal a1 of the first switch transistor M1 and the first terminal of the first voltage divider resistor R1 in the voltage divider circuit 411. When the LiDAR 100 is turned off or enters a sleep state, the control system 50 controls the voltage source 43 to output a high-level control voltage V2, so that the first switch transistor M1 is turned on and the discharge circuit 42 is short-circuited, thereby using the discharge circuit 42 to release the reverse induction electromotive force generated because the galvanometer motor 20 continues working under action of inertia when the LiDAR 100 is turned off or enters the sleep state. When the LiDAR 100 works normally, the control system 50 controls the voltage source 43 to output a low-level control voltage V2, so that the first switch transistor M1 is turned off, the discharge circuit 42 is disconnected, and the galvanometer motor 20 can work normally when driven by the drive circuit 30.

In some embodiments, the discharge circuit 42 includes a second switch transistor M2, a third switch transistor M3 and a bias resistor R3. The second switch transistor M2 has a second input terminal b2, a second output terminal c2 and a second controlled terminal a2. The third switch transistor M3 has a third input terminal b3, a third output terminal c3 and a third controlled terminal a3. The second controlled terminal a2 and the third controlled terminal a3 are jointly connected to the first output terminal c1 and a first terminal of the bias resistor R3. The second output terminal c2 and the third output terminal c3 are jointly connected to a second terminal of the bias resistor R3. The second input terminal b2 is connected to the driving positive electrode V1+, and the third input terminal b3 is connected to the driving negative electrode V1−.

Based on the foregoing connection relationship, the second controlled terminal a2 and the third controlled terminal a3 are jointly connected to the first output terminal c1, the second controlled terminal a2 and the third controlled terminal a3 can receive a voltage signal output by the first output terminal c1, the second controlled terminal a2 and the third controlled terminal a3 are jointly connected to the first terminal of the bias resistor R3, and the second output terminal c2 and the third output terminal c3 are also jointly connected to the second terminal of the bias resistor R3. In this way, when the first output terminal c1 of the first switch transistor M1 outputs a high-level signal, the bias resistor R3 can ensure that a voltage difference required for turning on the second switch transistor M2 is generated between the second controlled terminal a2 and the second output terminal c2, so that the second switch transistor M2 is turned on. Similarly, when the first output terminal c1 of the first switch transistor M1 outputs a high-level signal, the bias resistor R3 can ensure that a voltage difference required for turning on the third switch transistor M3 is generated between the third controlled terminal a3 and the third output terminal c3, so that the third switch transistor M3 is turned on. Conversely, when the first output terminal c1 of the first switch transistor M1 outputs a low-level signal, the voltage difference required for turning on the second switch transistor M2 cannot be generated between the second controlled terminal a2 and the second output terminal c2, so that the second switch transistor M2 is turned off; and the voltage difference required for turning on the third switch transistor M3 cannot be generated between the third controlled terminal a3 and the third output terminal c3, so that the third switch transistor M3 is turned off. At this time, the galvanometer motor 20 can work normally.

Further, because the second input terminal b2 is connected to the driving positive electrode V1+ of the galvanometer motor 20, the third input terminal b3 is connected to the driving negative electrode V1− of the galvanometer motor 20, and during the power failure of the galvanometer motor 20, a reverse induction electromotive force is generated because the galvanometer motor 20 continues working under action of inertia. At this time, the second switch transistor M2 and the third switch transistor M3 are controlled to be turned on simultaneously, and the discharge circuit 42 is short-circuited. At this time, the driving positive electrode V1+ and the driving negative electrode V1− of the galvanometer motor 20 are directly short-circuited through the discharge circuit 42, so that the reverse induction electromotive force generated because the galvanometer motor 20 continues working under action of inertia can be released.

Further, the discharge circuit 42 also includes a diode D, an anode of the diode D is connected to the second terminal of the bias resistor R3, and a cathode of the diode D is grounded. By disposing the diode D, the bias resistor R3 can be grounded through the diode D, so that a voltage difference capable of turning on the second switch transistor M2 can be generated between the second controlled terminal a2 and the second output terminal c2, and a voltage difference capable of turning on the third switch transistor M3 can be generated between the third controlled terminal a3 and the third output terminal c3. By using the unidirectional conduction characteristic of the diode D, when the voltage difference between the driving positive electrode V1+ and the driving negative electrode V1− is negative, the ground level can be prevented from causing voltage backflow at the second controlled terminal a2 and the third controlled terminal a3 through the bias resistor R3.

In some embodiments, the discharge circuit 42 further includes an adjusting resistor R4, a first terminal of the adjusting resistor R4 is connected to the second terminal of the biasing resistor R3, and a second terminal of the adjusting resistor R4 is connected to the anode of the diode D. Adjusting resistance of the adjusting resistor R4 can adjust a range of the voltage difference between the second controlled terminal a2 and the second output terminal c2, and adjust a range of the voltage difference between the third controlled terminal a3 and the third output terminal c3, so that the second switch transistor M2 and the third switch transistor M3 are turned on or off more quickly in response to a level signal output by the first output terminal c1.

In some embodiments, the discharge circuit 42 further includes a first discharge resistor R5 and a second discharge resistor R6, the second input terminal b2 is connected to the driving positive electrode V1+ through the first discharge resistor R5, and the third input terminal b3 is connected to the driving negative electrode V1− through the second discharge resistor R6. Adjusting resistance of the first discharge resistor R5 and the second discharge resistor R6 can adjust a discharge rate of the discharge circuit 42. Any position in a loop formed by the driving positive electrode V1+, the first discharge resistor R5, the first switch transistor M2, the third switch transistor M3, the second discharge resistor R6, and the driving negative electrode V1− is grounded, to release the reverse induction electromotive force generated because the galvanometer motor 20 continues working under action of inertia.

In some embodiments, the first switch transistor M1 is a PMOS transistor, a gate of the PMOS transistor is used as the first controlled terminal a1, a source of the PMOS transistor is used as the first input terminal b1, and a drain of the PMOS transistor is used as the first output terminal c1. The second switch transistor M2 and the third switch transistor M3 are the first NMOS transistor and the second NMOS transistor respectively, the gate of the first NMOS transistor is used as the second controlled terminal a2, the source of the second NMOS transistor is used as the second input terminal c2, the drain of the second NMOS transistor is used as the second output terminal b2, the gate of the second NMOS transistor is used as the third controlled terminal a3, the source of the second NMOS transistor is used as the third input terminal c3, and the drain of the second NMOS transistor is used as the third output terminal b3. In other embodiments, the first switch transistor M1 may also be an NMOS transistor, and both the second switch transistor M2 and the third switch transistor M3 are PMOS transistors.

A working principle of the control circuit 40 in an embodiment of this application is described in detail below with reference to the embodiment shown in FIG. 2:

During the normal working process of the LiDAR 100, the control system 50 controls the voltage source 43 to output a low-level signal. At this time, the first switch transistor M1, that is, the PMOS transistor, is turned off. Due to a special connection form of the circuit shown in FIG. 2, the drain of the PMOS transistor is in an open drain state, a gate voltage of the second switch transistor M2, that is, the first NMOS transistor, follows a source voltage of the first NMOS transistor, a voltage difference is not generated between the gate of the first NMOS transistor and the source of the first NMOS transistor, and the first NMOS transistor is in an off state. Similarly, the gate voltage of the third switch transistor M3, that is, the second NMOS transistor, follows the source voltage of the second NMOS transistor, a voltage difference is not generated between the gate of the second NMOS transistor and the source of the second NMOS transistor, the second NMOS transistor is in an off state, the discharge circuit 42 is in a disconnected state, and the drive circuit 30 can normally drive the galvanometer motor 20 to work.

When power failure of the galvanometer motor 20 occurs because the LiDAR 100 is turned off or enters a sleep state, a reverse induction electromotive force is generated because the galvanometer motor 20 continues working under action of inertia. At this time, the control system 50 controls the voltage source 43 to output a high-level signal. At this time, the first switch transistor M1, that is, the PMOS transistor, is turned on, and a high-level signal is output by the first output terminal c1, that is, the source of the PMOS transistor. Due to existence of the bias resistor R3, there is a voltage difference between the gate and the source of the second switch transistor M2, that is, the first NMOS transistor, so that the first NMOS transistor is turned on. Similarly, there is a voltage difference between the gate and the source of the third switch transistor M3, that is, the second NMOS transistor, so that the second NMOS transistor is turned on. At this time, regardless of whether the reverse induction electromotive force generated between the driving positive electrode V1+ and the driving negative electrode V1− of the galvanometer motor 20 is a positive or negative voltage, the reverse induction electromotive force can be released through direct short circuit of the first NMOS transistor and the second NMOS transistor.

The foregoing working principle is further illustrated below with reference to experimental results. In an example, the circuit shown in FIG. 2 is used, the first voltage divider resistor R1, the second voltage divider resistor R2, the bias resistor R3, the first discharge resistor R5 and the second discharge resistor R6 all have resistance of 10 kΩ, and resistance of the adjusting resistor R4 is 1 kΩ. The first switch transistor M1 is a PMOS transistor, the second switch transistor M2 and the third switch transistor M3 are respectively the first NMOS transistor and the second NMOS transistor, and the drive circuit 30 drives the voltage between the driving positive electrode V1+ and the driving negative electrode V1− of the galvanometer motor 20 to change between +12V and −12V.

Figure 3:
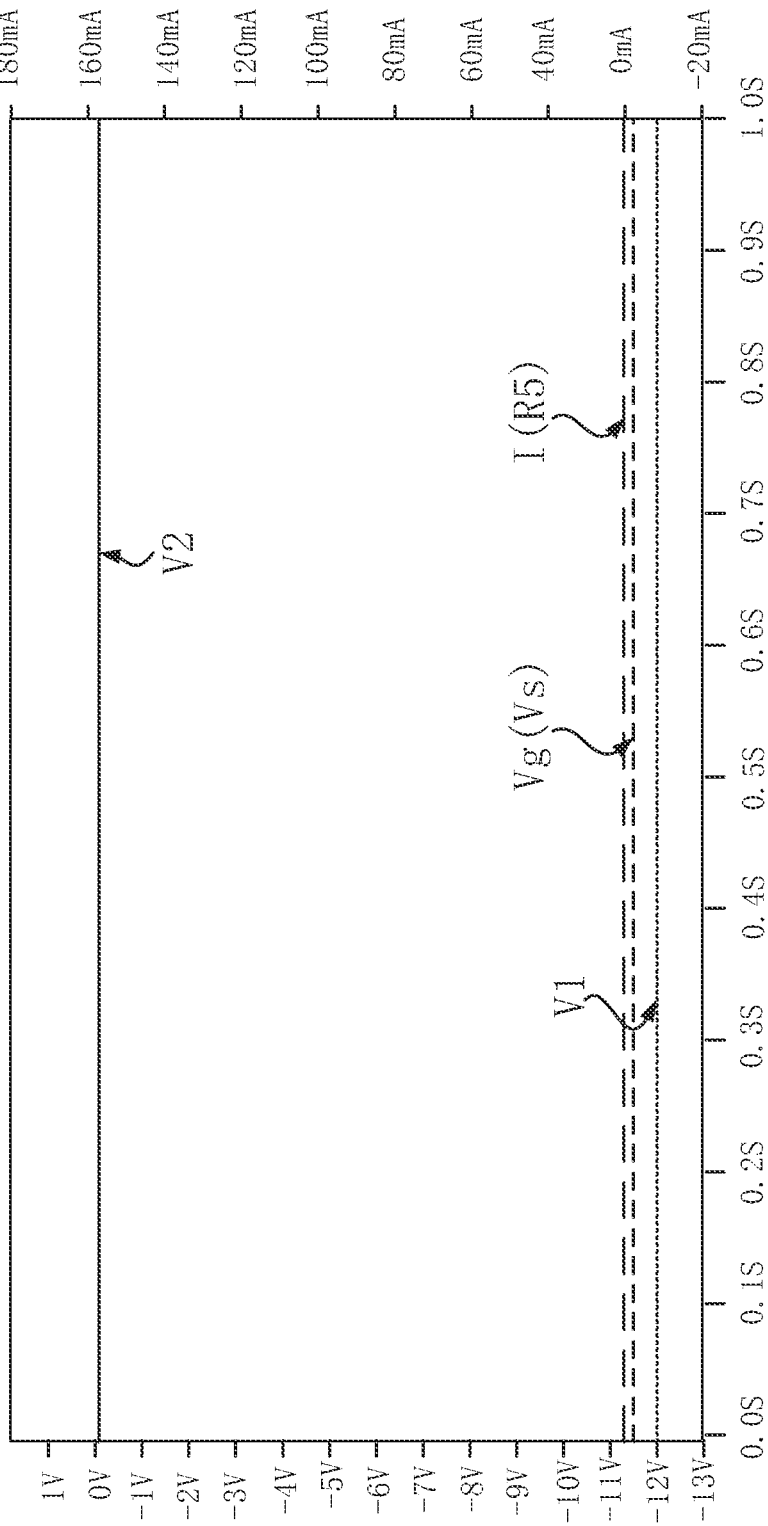
FIG. 3 is a schematic diagram of a simulation of a control circuit according to an embodiment of this application.

Referring to FIG. 3, when the LiDAR 100 works normally, the voltage difference V1 between the driving positive electrode V1+ and the driving negative electrode V1− is −12V, and the voltage source 43 outputs a low-level control signal V2 (0V), the first switch transistor M1, that is, the PMOS transistor, is disconnected, a gate voltage Vg at the second controlled terminal a2 and a source voltage Vs at the second output terminal c2 of the second switch transistor M2, that is, the first NMOS transistor, are also both about −12V, there is no voltage difference between the gate and the source of the first NMOS transistor, and therefore, the first NMOS transistor is turned off. Similarly, a gate voltage Vg at the third controlled terminal a3 and a source voltage Vs at the third output terminal c3 of the third switch transistor M3, that is, the second NMOS transistor, are also both about −12V, and the second NMOS transistor is disconnected. At this time, no current flows through the first discharge resistor R5, a current on the first discharge resistor R5 is about 0 mA, the discharge circuit 42 is disconnected, and the galvanometer motor 20 works normally.

Figure 4:
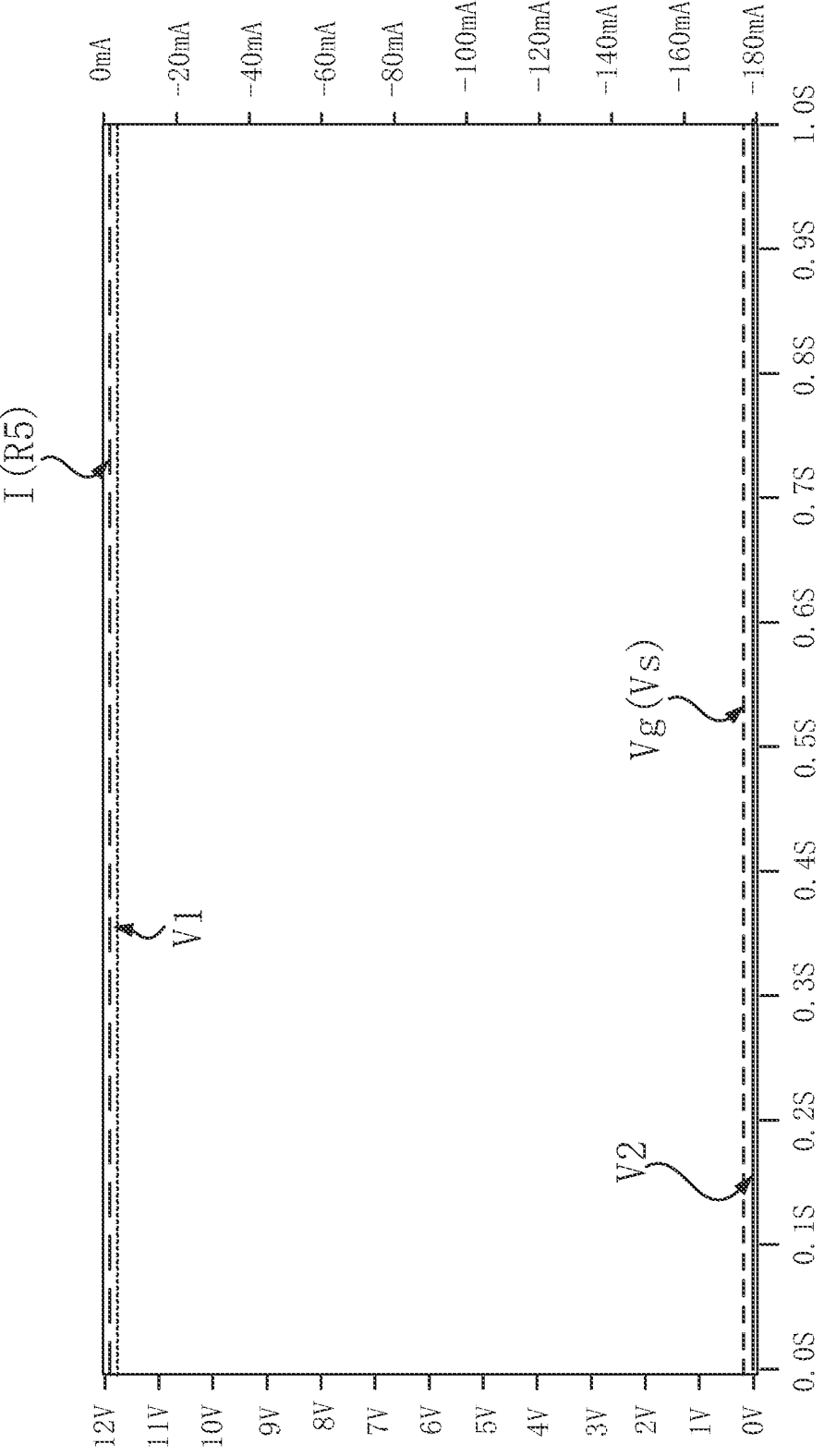
FIG. 4 is a schematic diagram of another simulation of a control circuit according to an embodiment of this application.

Referring to FIG. 4, when the LiDAR 100 works normally, the voltage difference V1 between the driving positive electrode V1+ and the driving negative electrode V1− is +12V, and the voltage source 43 outputs a low-level control signal V2 (0V), the first switch transistor M1, that is, the PMOS transistor, is turned off, a gate voltage Vg at the second controlled terminal a2 and a source voltage Vs at the second output terminal c2 of the second switch transistor M2, that is, the first NMOS transistor, are both about 0V, there is no voltage difference between the gate and the source of the first NMOS transistor, and therefore, the first NMOS transistor is turned off. Similarly, a gate voltage Vg at the third controlled terminal a3 and a source voltage Vs at the third output terminal c3 of the third switch transistor M3, that is, the second NMOS transistor, are both about 0V, and the second NMOS transistor is turned off. At this time, no current flows through the first discharge resistor R5, a current on the first discharge resistor R5 is about 0 mA, the discharge circuit 42 is disconnected, and the galvanometer motor 20 works normally.

Figure 5:
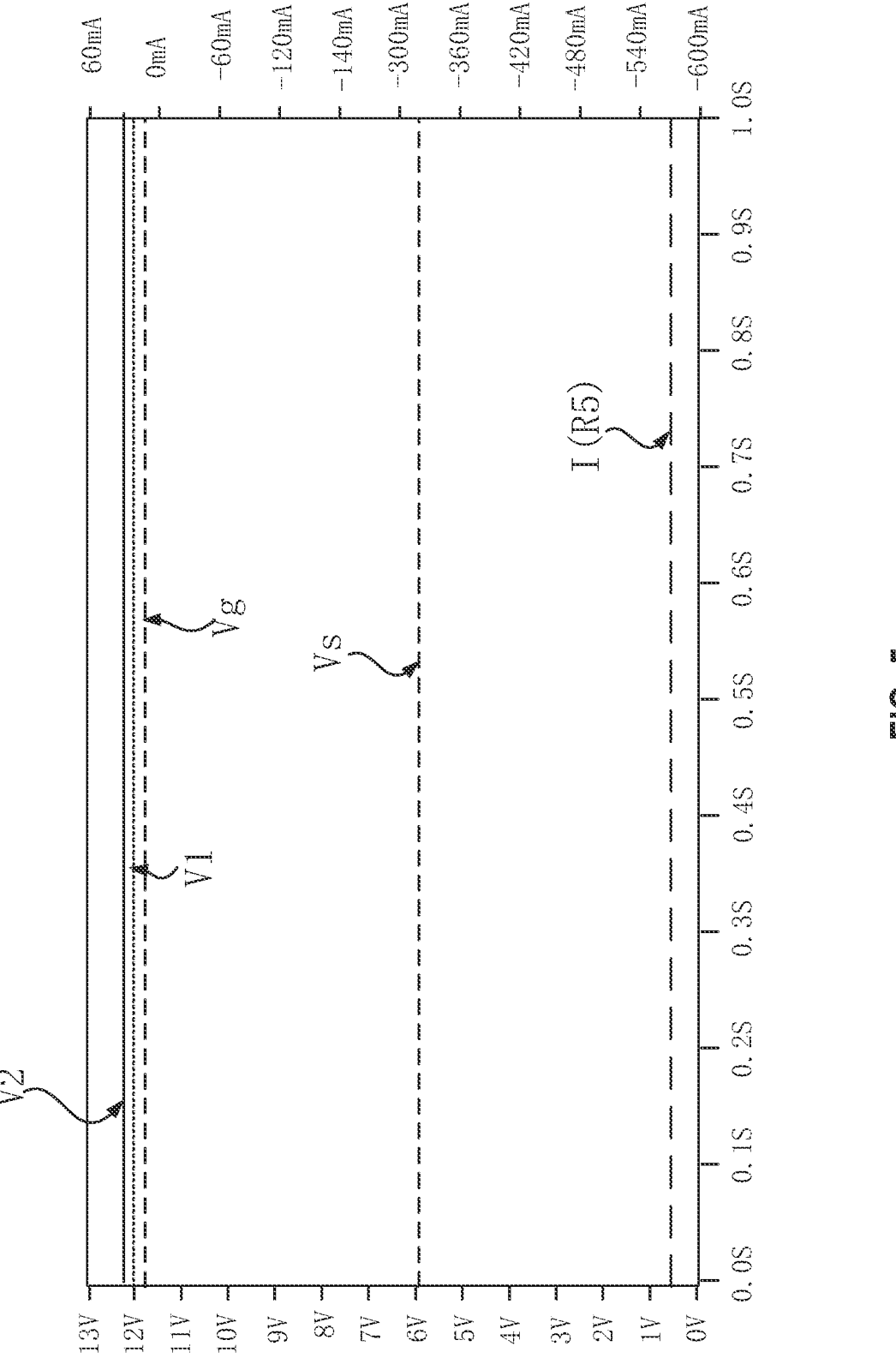
FIG. 5 is a schematic diagram of still another simulation of a control circuit according to an embodiment of this application.

Referring to FIG. 5, when the power failure of the galvanometer motor 20 occurs because the LiDAR 100 is turned off or enters a sleep state, there is a voltage difference V1 of +12V between the driving positive electrode V1+ and the driving negative electrode V1− because a reverse induction electromotive force is generated, and the voltage source 43 outputs a high-level control signal V2 (12V), the first switch transistor M1, that is, the PMOS transistor, is turned on, a gate voltage Vg at the second controlled terminal a2 of the second switch transistor M2, that is, the first NMOS transistor, is about 12V, a source voltage Vs at the second output terminal c2 is about 6V, there is a voltage difference of 6V between the gate and the source of the first NMOS transistor, and therefore, the first NMOS transistor is turned on. Similarly, a gate voltage Vg at the third controlled terminal a3 of the third switch transistor M3, that is, the second NMOS transistor, is about 12V, a source voltage Vs at the third output terminal c3 is about 6V, there is a voltage difference of 6V between the gate and the source of the second NMOS transistor, and therefore, the second NMOS transistor is turned on. At this time, a negative current I (R5) of about −580 mA flows through the first discharge resistor R5, to quickly discharge two terminals of the galvanometer motor 20, that is, the driving positive electrode V1+ and the driving negative electrode V1−.

Figure 6:
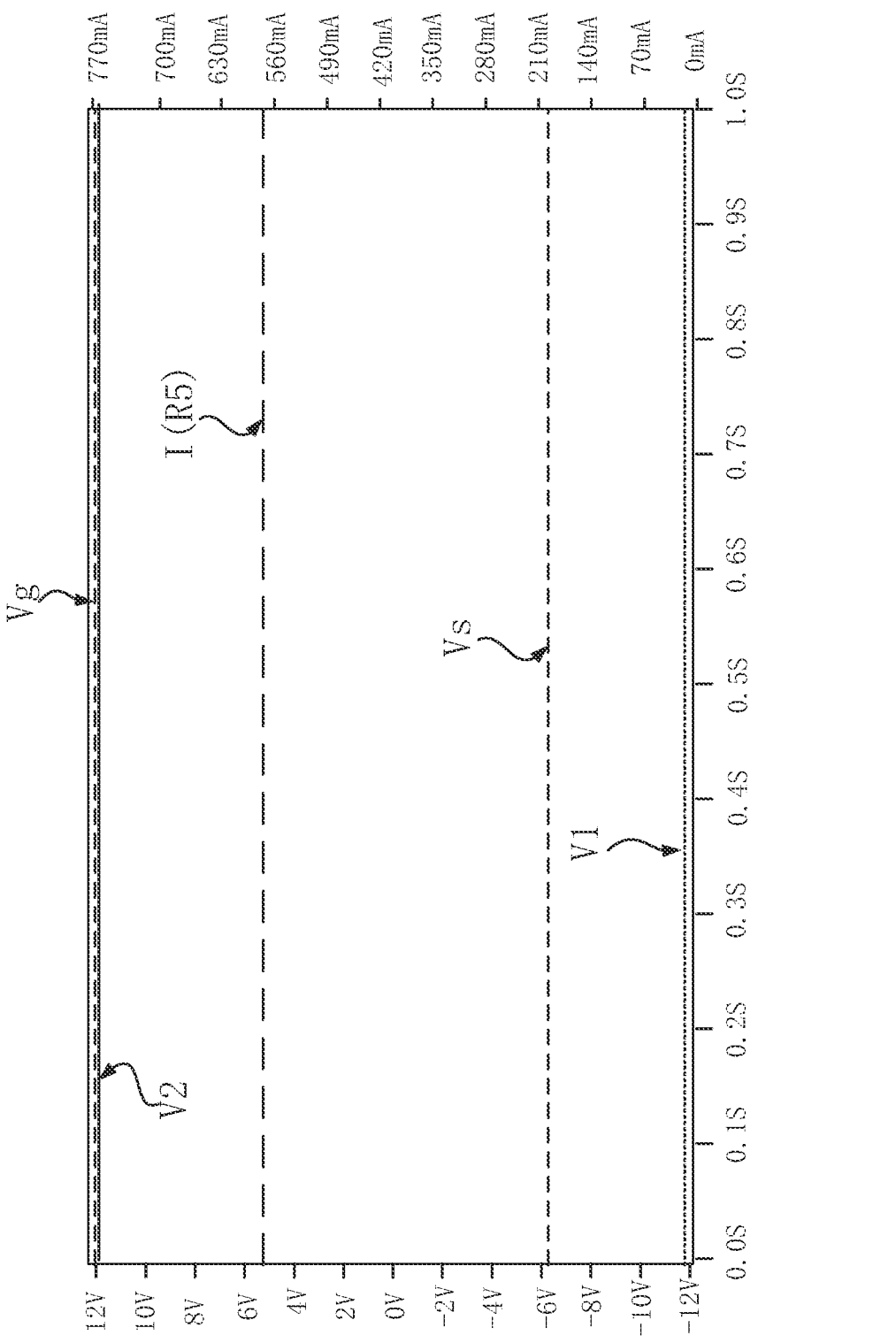
FIG. 6 is a schematic diagram of yet another simulation of a control circuit according to an embodiment of this application.

Referring to FIG. 6, when the power failure of the galvanometer motor 20 occurs because the LiDAR 100 is turned off or enters a sleep state, there is a voltage difference V1 of −12V between the driving positive electrode V1+ and the driving negative electrode V1− because a reverse induction electromotive force is generated, and the voltage source 43 outputs a high-level control signal V2 (12V), the first switch transistor M1, that is, the PMOS transistor, is turned on, a gate voltage Vg at the second controlled terminal a2 of the second switch transistor M2, that is, the first NMOS transistor, is about 12V, a source voltage Vs at the second output terminal c2 is about −6V, there is a voltage difference of −18V between the gate and the source of the first NMOS transistor, and therefore, the first NMOS transistor is turned on. Similarly, a gate voltage Vg at the third controlled terminal a3 of the third switch transistor M3, that is, the second NMOS transistor, is about 12V, a source voltage Vs at the third output terminal c3 is about −6V, there is a voltage difference of −18V between the gate and the source of the second NMOS transistor, and therefore, the second NMOS transistor is turned on. At this time, a positive current I (R5) of about 580 mA flows through the first discharge resistor R5, to quickly discharge two terminals of the galvanometer motor 20, that is, the driving positive electrode V1+ and the driving negative electrode V1−.

Technical features in the foregoing embodiments can be combined. For brevity, not all possible combinations of the technical features in the foregoing embodiments are described. However, so long as the combinations of these technical features are not contradictory, the combinations should be considered as falling within the range recorded in this specification.

What is claimed is:

1. A control circuit of a galvanometer motor, configured to control the galvanometer motor to be discharged during a power failure, wherein the control circuit comprises:

a switch circuit, configured to access a control voltage; and a discharge circuit, connected to the switch circuit and configured to be connected to a driving positive electrode and a driving negative electrode of the galvanometer motor, wherein during the power failure, the switch circuit controls the discharge circuit to be short-circuited based on the control voltage, to release a reverse induction electromotive force between the driving positive electrode and the driving negative electrode of the galvanometer motor that is generated due to the power failure;

wherein the switch circuit comprises:

a voltage divider circuit comprising at least two voltage divider resistors, wherein the voltage divider circuit comprises a terminal configured to access the control voltage, and the other terminal that is grounded, and there is a voltage divider node between any two of the voltage divider resistors; and a first switch transistor having a first input terminal, a first output terminal, and a first controlled terminal, wherein the first input terminal is configured to access a first control voltage, the first output terminal is connected to the discharge circuit, and the first controlled terminal is connected to the voltage divider node;

wherein the discharge circuit comprises a second switch transistor, a third switch transistor, and a bias resistor;

wherein the second switch transistor comprises a second input terminal, a second output terminal, and a second controlled terminal;

wherein the third switch transistor comprises a third input terminal, a third output terminal, and a third controlled terminal;

wherein the second controlled terminal and the third controlled terminal are jointly connected to the first output terminal and a first terminal of the bias resistor;

wherein the second output terminal and the third output terminal are jointly connected to a second terminal of the bias resistor; and wherein the second input terminal is connected to the driving positive electrode, and the third input terminal is connected to the driving negative electrode.

2. The control circuit according to claim 1, wherein the voltage divider circuit comprises a first voltage divider resistor and a second voltage divider resistor connected in series, and wherein a first terminal of the first voltage divider resistor is configured to access the first control voltage, a second terminal of the first voltage divider resistor is connected to a first terminal of the second voltage divider resistor and the voltage divider node, and a second terminal of the second voltage divider resistor is grounded.

3. The control circuit according to claim 1, wherein the discharge circuit further comprises:

a diode, wherein an anode of the diode is connected to a second terminal of the bias resistor, and a cathode of the diode is grounded.

4. The control circuit according to claim 2, wherein for the same type of traffic participant, the higher the hazard level corresponding to the travel direction of the vehicle, the greater the width of the first warning region; and wherein for the same type of travel direction, the higher the hazard level corresponding to the type of the traffic participant, the greater the width of the first warning region.

5. The control circuit according to claim 2, wherein the discharge circuit further comprises:

a first discharge resistor, wherein the second input terminal is connected to the driving positive electrode through the first discharge resistor; and a second discharge resistor, wherein the third input terminal is connected to the driving negative electrode through the second discharge resistor.

6. The control circuit according to claim 1, wherein the first switch transistor is a PMOS transistor, and the second switch transistor and the third switch transistor are both NMOS transistors.

7. The control circuit according to claim 6, further comprising:

a voltage source, connected to the switch circuit and configured to: output a high-level control voltage to the switch circuit during the power failure of the galvanometer motor, and output a low-level control voltage to the switch circuit when the galvanometer motor is powered on.

8. A LiDAR, comprising:

a galvanometer, configured to change an outgoing direction of a laser beam;

a galvanometer motor, drivingly connected to the galvanometer and having a driving positive electrode and a driving negative electrode; and a control circuit of the galvanometer motor, comprising:

a switch circuit, configured to access a control voltage; and a discharge circuit, connected to the switch circuit and configured to be connected to the driving positive electrode and the driving negative electrode of the galvanometer motor, wherein during a power failure, the switch circuit controls the discharge circuit to be short-circuited based on the control voltage, to release a reverse induction electromotive force between the driving positive electrode and the driving negative electrode of the galvanometer motor that is generated due to the power failure;

wherein the switch circuit comprises:

a voltage divider circuit comprising at least two voltage divider resistors, wherein the voltage divider circuit comprises a terminal configured to access the control voltage, and the other terminal that is grounded, and there is a voltage divider node between any two of the voltage divider resistors; and a first switch transistor having a first input terminal, a first output terminal, and a first controlled terminal, wherein the first input terminal is configured to access a first control voltage, the first output terminal is connected to the discharge circuit, and the first controlled terminal is connected to the voltage divider node;

wherein the discharge circuit comprises a second switch transistor, a third switch transistor, and a bias resistor;

wherein the second switch transistor comprises a second input terminal, a second output terminal, and a second controlled terminal;

wherein the third switch transistor comprises a third input terminal, a third output terminal, and a third controlled terminal;

wherein the second controlled terminal and the third controlled terminal are jointly connected to the first output terminal and a first terminal of the bias resistor;

wherein the second output terminal and the third output terminal are jointly connected to a second terminal of the bias resistor; and wherein the second input terminal is connected to the driving positive electrode, and the third input terminal is connected to the driving negative electrode.

* * * * *